United States Patent
Ikegawa et al.

(10) Patent No.: US 9,312,034 B2
(45) Date of Patent: Apr. 12, 2016

(54) PASSIVE RESIDUAL HEAT REMOVAL SYSTEM AND NUCLEAR POWER PLANT EQUIPMENT

(71) Applicant: Hitachi-GE Nuclear Energy, Ltd., Hitachi-shi, Ibaraki (JP)

(72) Inventors: Tomohiko Ikegawa, Tokyo (JP); Kazuaki Kito, Tokyo (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 483 days.

(21) Appl. No.: 14/060,201

(22) Filed: Oct. 22, 2013

(65) Prior Publication Data

US 2014/0112426 A1    Apr. 24, 2014

(30) Foreign Application Priority Data

Oct. 24, 2012   (JP) ................. 2012-234411

(51) Int. Cl.
  *G21C 15/18*   (2006.01)
  *G21C 9/012*   (2006.01)
(52) U.S. Cl.
  CPC .............. *G21C 15/18* (2013.01); *G21C 9/012* (2013.01); *Y02E 30/40* (2013.01)
(58) Field of Classification Search
  CPC .............................. G21C 15/18; G21C 9/012
  USPC .................................................. 376/282, 283
  See application file for complete search history.

(56) References Cited

U.S. PATENT DOCUMENTS

2009/0060112 A1    3/2009   Kojima et al.

FOREIGN PATENT DOCUMENTS

| JP | 61-173196 | | 8/1986 |
|---|---|---|---|
| JP | 05-203781 | A | 8/1993 |
| JP | 5-323084 | | 12/1993 |
| JP | 6-214082 | | 8/1994 |
| JP | 6-265673 | | 9/1994 |
| JP | 10-221477 | | 8/1998 |
| JP | 2003-240888 | A | 8/2003 |
| JP | 2006-162559 | | 6/2006 |
| JP | 2009-053049 | A | 3/2009 |
| JP | 2010-237070 | | 10/2010 |
| JP | 2011-137709 | A | 7/2011 |

OTHER PUBLICATIONS

U.S. Appl. No. 13/903,427, filed May 28, 2013.
European Search Report dated Feb. 3, 2014 (7 pages).
Japanese Office Action dated Feb. 2, 2016 with English-language translation.

*Primary Examiner* — Jack W Keith
*Assistant Examiner* — Daniel Wasil
(74) *Attorney, Agent, or Firm* — Crowell & Moring LLP (57) ABSTRACT

The invention includes a heat exchanger provided at a position higher than a primary containment vessel; a condensate storage tank disposed below the heat exchanger and above an upper end of a reactor core placed in a reactor pressure vessel; a non-condensate gas discharge line connected to an upper section of the condensate storage tank and to a suppression pool; a second condensate discharge line connected to a position below that section of the condensate storage tank to which a first end of the non-condensate gas discharge line is connected, and to the suppression pool; and a condensate return line connected to a position below that section of the condensate storage tank to which a first end of the second condensate discharge line is connected, and to a side portion of the reactor pressure vessel, the side portion being above the upper end of the core.

5 Claims, 5 Drawing Sheets

PRIOR ART

PASSIVE RESIDUAL HEAT REMOVAL SYSTEM AND NUCLEAR POWER PLANT EQUIPMENT

BACKGROUND OF THE INVENTION

1. Field of the Invention

The present invention relates generally to passive residual heat removal systems and nuclear power plant equipment. More particularly, the invention is directed to a passive residual heat removal system suitable for application to, and nuclear power plant equipment suitably applicable as, boiling-water reactor equipment.

2. Description of the Related Art

For example, JP-2003-240888-A discloses a primary containment vessel cooling system designed so that in case of fluid line breakage of a nuclear reactor, the system can suppress increases in surface temperature of a suppression pool, and thereby suppress increases in containment vessel pressure.

Figure 5:
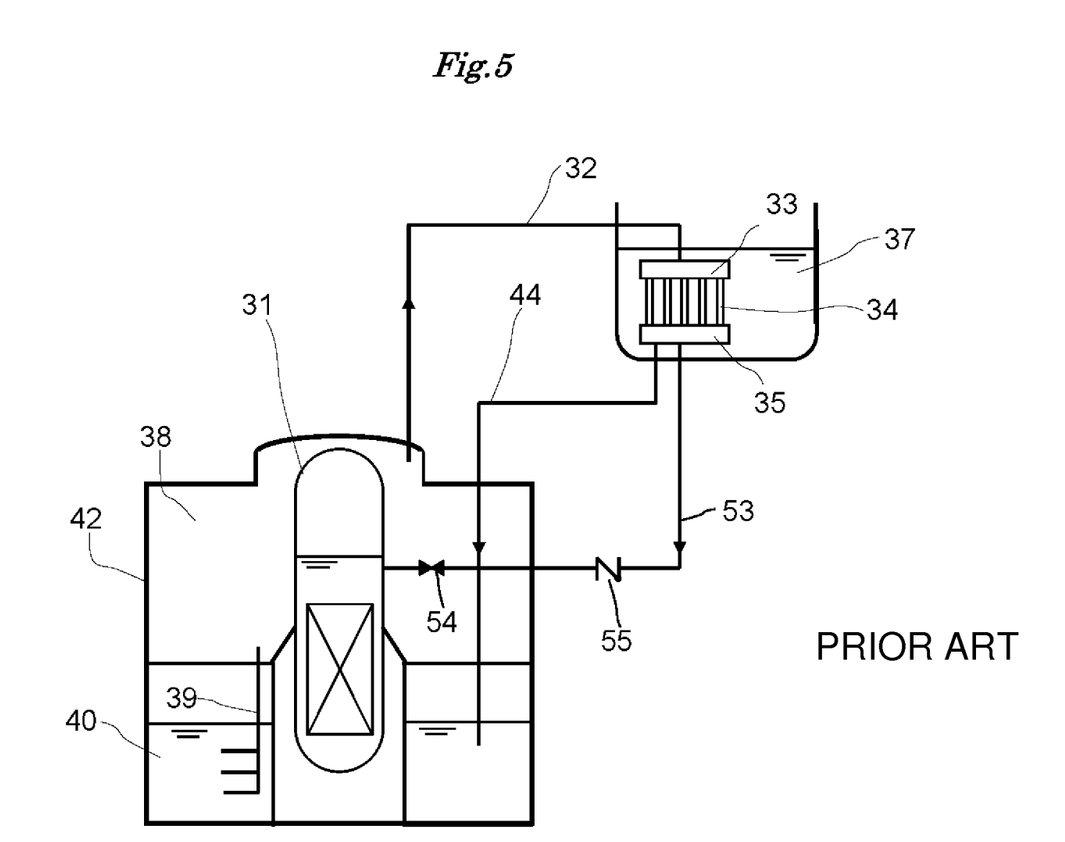
FIG. 5 is a system diagram showing a configuration of a conventional primary containment vessel cooling system.

As shown in FIG. 5, the primary containment vessel cooling system includes a coolant pool 37 filled with a coolant and opened to the atmosphere above a primary containment vessel 42, a heat exchanger 34 placed under the coolant in the coolant pool 37, a steam header 33 and condensate header 35 connected to an upper section and lower section, respectively, of the heat exchanger 34, a steam supply line 32 interconnecting a drywell 38 and the steam header 33, a condensate drain line 53 interconnecting the condensate header 35 and a reactor pressure vessel 31, and a non-condensable gas vent line 44 interconnecting the condensate header 35 and the suppression pool 40. A check valve 54 and a valve 55, both for preventing a backflow of a fluid from the reactor pressure vessel 31 into the condensate header 35, are arranged on the condensate drain line 53. The drywell 38 and the suppression pool 40 are interconnected by a vent line 39, the vent line 39 being open into both of the drywell and the suppression pool. The non-condensate gas vent line 44 is disposed so that height of its open end in an internal fluid of the suppression pool 40 is greater than height of an open end of the vent line 39 in another internal fluid of the suppression pool 40.

In case of fluid line breakage of the reactor pressure vessel 31, steam flows out from the reactor pressure vessel 31 through the broken line into the drywell 38. One part of the steam which flows out in this way is routed into the suppression pool 40 through the vent line 39 and becomes condensed. The remaining part of the steam which flows out is routed into the heat exchanger 34 via the steam supply line 32 and, after heat removal in the coolant pool 37 located outside the heat exchanger 34, becomes a condensate, which is then routed into the suppression pool 40 via the non-condensate gas vent line 44.

Immediately after the line breakage causing a large amount of steam to be released to the drywell 38, much of the steam is guided into the suppression pool 40 via the vent line 39 having a large bore. After this, when the amount of decay heat decreases and thus the amount of steam released also decreases, a pressure loss in the flow channel routed via the heat exchanger 34 will be less than that of the flow channel routed via the vent line 39. As a result, the condensate of the steam which has flown through the heat exchanger 34 and the non-condensate gas vent line 44 will be guided to the suppression pool 40.

In this case, the difference between the flow channel pressure losses on the two routes arises from the fact that the open end of the non-condensate gas vent line 44 in one internal fluid of the suppression pool 40 is disposed at a height greater than the open-end height of the vent line 39 in the other internal fluid of the suppression pool 40.

In addition, the condensate that was condensed in the heat exchanger 34 and will be used as a coolant can be returned to the reactor pressure vessel 31 by opening the valve 54 on the condensate drain line 53 after an internal pressure of the reactor pressure vessel 31 and that of the drywell 38 have become substantially equal.

SUMMARY OF THE INVENTION

In the above primary containment vessel cooling system based upon related art, even in case of fluid line breakage of the reactor pressure vessel, the steam that has been generated in the reactor pressure vessel 31 can be returned to a state of a condensate, which can then be supplied as a coolant to the reactor pressure vessel 31 to maintain its coolant inventory over long periods of time. Hence, stable cooling of the reactor core can be continued.

Under such line breakage, however, if a case in which for whatever reason the valve 54 cannot be opened is assumed, it will be impossible to supply a coolant to the reactor pressure vessel 31 and thus to maintain its coolant inventory. If this situation actually happens and the change in state quantity that is described below follows, a consequential increase in internal pressure of the primary containment vessel 42 is likely to result in its high-pressure state persisting.

For example, as the condensate of the steam which has flown through the heat exchanger 34 and the non-condensate gas vent line 44 is being guided into the suppression pool 40, since the coolant pool 37 located outside the heat exchanger 34 is installed under an atmospheric pressure environment, the coolant is likely to boil during the removal of decay heat and reach a temperature of 100° C. Accordingly, the condensate temperature at an outlet of the heat exchanger 34 would not decrease below 100° C. and as a result, this relatively hot condensate would flow into the suppression pool 40 via the non-condensate gas vent line 44.

As discussed above, the open end of the non-condensate gas vent line 44 is disposed at a height greater than that of one open end of the vent line 39, and is opened at a position in the suppression pool 40, near a liquid level of the condensate in the pool 40. For this reason, if the condensate exceeding 100° C. is locally released to a position neighboring the liquid level in the suppression pool 40, the temperature of the condensate near the liquid level in the suppression pool 40 will locally become high, with temperature stratification being likely to result. In such a state, a space temperature above the liquid level in the suppression pool 40 is likely to rise above 100° C., which would in turn increase a saturated steam pressure and a partial pressure of nitrogen, hence resulting in the primary containment vessel 42 being maintained in the high-pressure state.

The present invention has been made with the above matter as its design basis, and an object of the invention is to provide the following: a highly reliable passive residual heat removal system and nuclear power plant equipment configured to maintain coolant inventory of a reactor pressure vessel over long periods of time even under a fluid line breakage state of the reactor pressure vessel, and to alleviate a rise in an internal pressure of a primary containment vessel even if, for whatever reason, supply of the coolant to the reactor pressure vessel fails.

For example, a configuration described in the claims accompanying the present application is adopted to solve the foregoing problems. The present invention includes a plurality of means for solving the problems. Among these means are: a primary containment vessel including a drywell to surround a reactor pressure vessel, and a suppression chamber internally provided with a suppression pool; a vent line connecting the drywell and the suppression pool, the vent line being fitted with a plurality of openings in the suppression pool; a coolant pool filled with a coolant and provided above the primary containment vessel; a heat exchanger placed under the coolant in the coolant pool; a steam suction line connecting the drywell and the heat exchanger; a condensate storage tank disposed below the heat exchanger and above an upper end of a reactor core placed in the reactor pressure vessel; a first condensate discharge line connecting the condensate storage tank and the heat changer; a non-condensate gas discharge line connected at a first end thereof to an upper section of the condensate storage tank and at a second end thereof to the suppression pool, the second end of the non-condensate gas discharge line being open at a position higher than a highest opening of the vent line in the suppression pool; a second condensate discharge line connected at a first end thereof to a position below that section of the condensate storage tank to which the first end of the non-condensate gas discharge line is connected, and at a second end thereof to the suppression pool, the second end of the second condensate gas discharge line being open at a position lower than a lowest opening of the vent line in the suppression pool; and a condensate return line connected at a first end thereof to a position below that section of the condensate storage tank to which the first end of the second condensate discharge line is connected, and at a second end thereof to a side portion of the reactor pressure vessel, the side portion being above the upper end of the core.

The present invention provides the highly reliable passive residual heat removal system and nuclear power plant equipment configured so that even in case of the line breakage of the reactor pressure vessel, the coolant inventory of the reactor pressure vessel can be maintained over long periods of time by condensing back into a state of a condensate the steam which has been generated in the reactor pressure vessel, and then supplying this condensate as a coolant to the reactor pressure vessel. In addition, a rise in the internal pressure of the primary containment vessel can be alleviated, even if for whatever reason the supply of the coolant to the reactor pressure vessel fails.

DESCRIPTION OF THE PREFERRED EMBODIMENTS

Hereunder, embodiments of a passive residual heat removal system and nuclear power plant equipment according to the present invention will be described using the accompanying drawings.

First Embodiment

Figure 1:
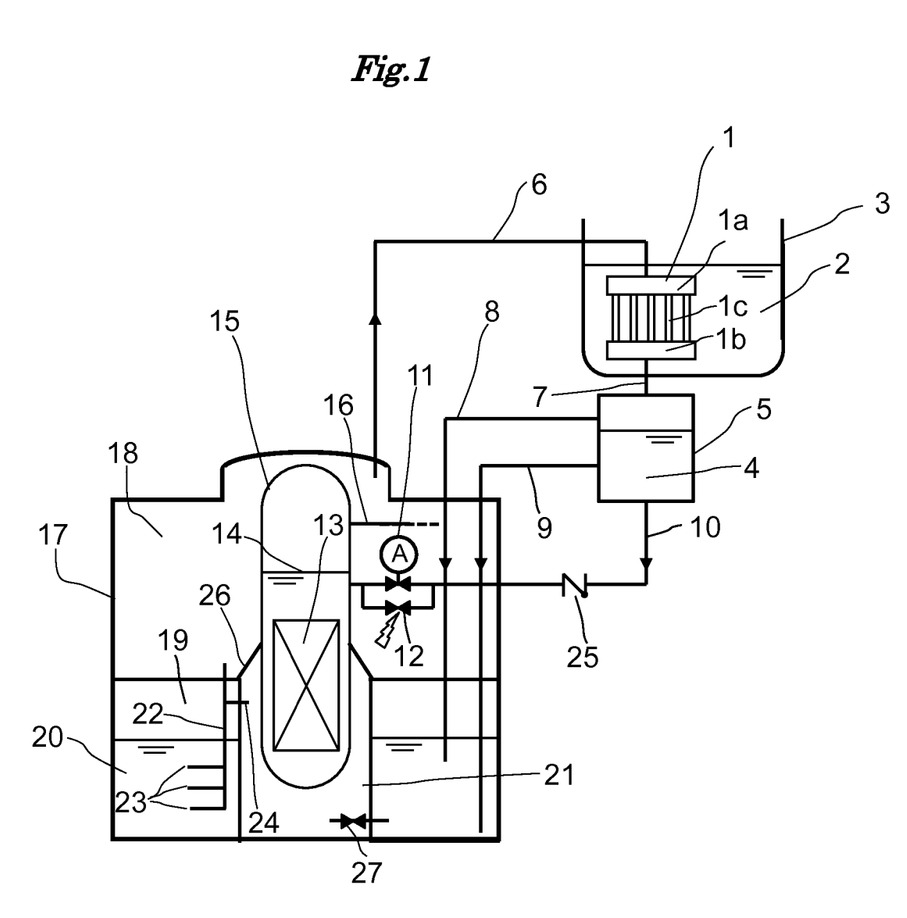
FIG. 1 is a system diagram showing a configuration of a passive residual heat removal system and nuclear power plant equipment according to a first embodiment of the present invention.

FIG. 1 is a system diagram showing a configuration of a passive residual heat removal system and nuclear power plant equipment according to a first embodiment of the present invention. The passive residual heat removal system in the present embodiment is applied to boiling-water reactor equipment. Referring to FIG. 1, the boiling-water reactor equipment includes a reactor pressure vessel 15, a reactor core 13, a primary containment vessel 17, and the passive residual heat removal system.

The core 13 preloaded with a plurality of fuel assemblies (not shown) is placed in the reactor pressure vessel 15. A coolant 14 for cooling the core 13 is also stored within the reactor pressure vessel 15 to maintain the entire core 13 in a cooled condition. Main steam lines 16 and a coolant injection line (not shown) are connected to the reactor pressure vessel 15.

The primary containment vessel 17 includes a drywell 18 surrounding an entire circumference of the reactor pressure vessel 15 and formed with an internal space divided into segments demarcated from each other. The primary containment vessel 17 also includes a pedestal 21 and a suppression chamber 19. Air in an internal space of the primary containment vessel 17 is displaced with nitrogen. This is conducted to eliminate oxygen in provision against a contingent hydrogen explosion.

The suppression chamber 19 is formed as an annular space encircling the pedestal 21 below the drywell 18, and a suppression pool 20 precharged with a coolant is provided in that space. A vent line 22 is placed inside the suppression chamber 19, the vent line 22 being opened at one end thereof into the drywell 18 and opened at the other end thereof as a plurality of steam discharge ports 23 of the vent line, in the coolant of the suppression pool 20. The present embodiment described herein assumes that three vent line steam discharge ports 23 are provided. In addition, the vent line 22 includes a branch above the coolant surface of the suppression pool 20. One end of a connecting hole 24 is connected to the branch, and the other end thereof is opened into the pedestal 21.

The pedestal 21 is formed directly under the reactor pressure vessel 15, as a space that is demarcated atop from the drywell 18 by a support skirt 26 of the reactor pressure vessel and laterally encircled with the annular suppression chamber 19. The pedestal 21 is spatially connected to the drywell 18 via the connecting hole 24 opened into an upper lateral portion of the pedestal 21. In addition, a fluid line connecting the suppression chamber 19 and the pedestal 21 is provided on a lower lateral portion of the pedestal 21, and a fusible plug valve 27 that opens/closes the line is placed in a region of the pedestal 21. The fusible plug valve 27 will fuse to open the line if a fall of the core 13 onto the pedestal 21 due to meltdown of the core results in the pedestal itself being heated and melted.

The passive residual heat removal system includes a heat exchanger 1, a coolant pool 3, a condensate storage tank 5, a steam suction line 6, a first condensate discharge line 7, a non-condensate gas discharge line 8, a second condensate discharge line 9, a condensate return line 10, an air-operated valve 11, a squib valve 12, and a check valve 25.

The pool 3 is filled with a coolant 2, under which the heat exchanger 1 is placed in the pool 3. The heat exchanger 1 includes a steam header 1a provided at an upper end of the exchanger and connected to the drywell 18 of the primary containment vessel 17 through the steam suction line 6, a condensate header 1b provided at a lower end of the exchanger and connected to an upper section of the condensate storage tank 5 through the first condensate discharge line 7, and a plurality of heat transfer lines 1c each connected at an upper end thereof to the steam header 1a and at a lower end thereof to the condensate header 1b.

The condensate storage tank 5 is placed below the pool 3 and above a fluid level 14a of the coolant 14 in the reactor pressure vessel 15. The condensate storage tank 5 temporarily holds a non-condensate gas and a condensate 4 as a coolant which has been formed by condensing in the heat exchanger 1. From the upper section of the condensate storage tank 5 to a lower section thereof in order, one end of the non-condensate gas discharge line 8, one end of the second condensate discharge line 9, and one end of the condensate return line 10 are connected to the tank 5 to discharge the non-condensate gas and the condensate 4 stored within the tank.

The non-condensate gas discharge line 8, connected at one end thereof to the upper section of the condensate storage tank 5, is opened at the other end thereof in the coolant of the suppression pool 20, the open end being positioned at a height greater than that of the highest discharge port of the vent line steam discharge ports 23 on the vent line 22.

The second condensate gas discharge line 9, connected at one end thereof to the second position on the upper section of the condensate storage tank 5, is opened at the other end thereof in the coolant of the suppression pool 20, the open end being positioned at a height smaller than that of the lowest discharge port of the vent line steam discharge ports 23 on the vent line 22.

The condensate return line 10, connected at one end thereof to the lowest section (e.g., bottom) of the condensate storage tank 5, is connected at the other end thereof to a lateral portion of the reactor pressure vessel 15, the lateral position being positioned above an upper end of the core 13. In addition, the check valve 25 that permits a flow of fluid from the condensate storage tank 5 and stops a flow of fluid from the reactor pressure vessel side is provided near the tank 5 on the condensate return line 10. Furthermore, parallel branches are provided near the reactor pressure vessel 15 on the condensate return line 10. The air-operated valve 11 is placed on one of the parallel branch lines, and the squib valve 12 on the other branch line.

Figure 2:
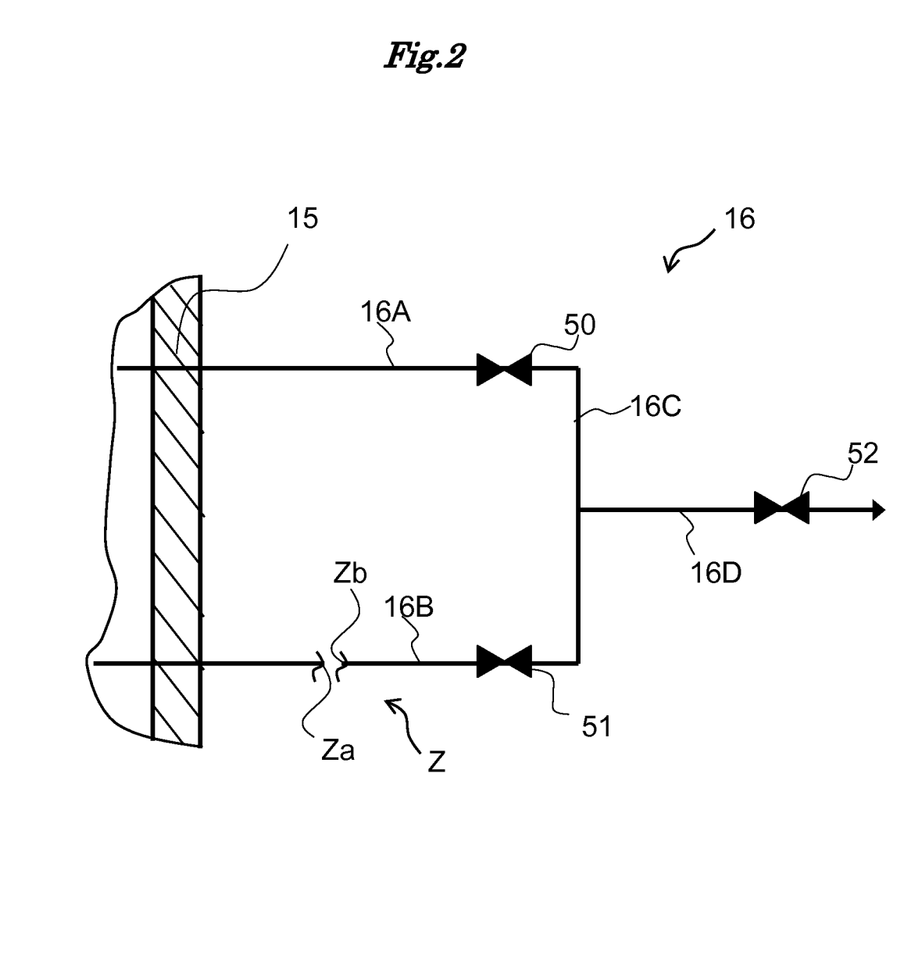
FIG. 2 is a system diagram showing a configuration of a main steam line in the passive residual heat removal system and nuclear power plant equipment according to the first embodiment.

The following describes how the passive residual heat removal system in the present embodiment operates if one of the main steam lines significantly breaks. FIG. 2 is a system diagram showing a configuration of one main steam line in the passive residual heat removal system and nuclear power plant equipment according to the first embodiment. Each element in FIG. 2 that is assigned the same reference number as used in FIG. 1 is the same element, so detailed description of these elements is omitted hereinafter.

Referring to FIG. 2, the main steam line 16 includes a first main steam line 16A connected at one end thereof to one steam extraction portion on the reactor pressure vessel 15, a second main steam line 16B connected at one end thereof to another steam extraction portion on the reactor pressure vessel 15, an interconnecting main steam line 16C connecting the other end of the first main steam line 16A and that of the second main steam line 16B, and a turbine steam line 16D connected at one end thereof to a branch provided on a substantially central section of the interconnecting main steam line 16C and at the other end thereof to an inflow end of a main steam stop valve 52 of a main turbine. The inflow end of the main steam stop valve 52 of the main turbine connects to the main turbine via a steam line. A first main steam isolation valve 50 and a second main steam isolation valve 51 are provided on the first main steam line 16A and the second main steam line 16B, respectively. The first main steam isolation valve 50 and the second main steam isolation valve 51 fully close in case of an excess flow of steam into the main steam line due to line breakage.

If the line breakage occurs at section Z of the second main steam line 16B in FIG. 2, the steam through the second main steam line 16B flows out directly from a broken surface Za of the line on an upstream side. The steam through the non-broken first main steam line 16A, on the other hand, flows back into the broken second main steam line 16B through the interconnecting main steam line 16C located at an upstream side of the turbine main steam stop valve 52, and flows out from a broken surface Zb of the second main steam line, on a downstream side.

The outflows of steam from the broken surfaces reduce an internal pressure of the reactor pressure vessel 15 shown in FIG. 1. The second main steal isolation valve 51 fully closes upon occurrence of a signal denoting that the main steam line flow rate has become excessive. After the second main steal isolation valve 51 has fully closed, the outflow of steam from the broken surface Zb on the downstream side stops and steam only flows out from the broken surface Za on the upstream side. The closed-state signal of the main steam isolation valve generates a scram signal, which then leads to all control rods being inserted into the core 13 and hence to reactor shutdown. Meanwhile, the outflow of steam from the broken surface Za into the drywell 18 increases an internal pressure of the drywell.

Referring back to FIG. 1, the increase in the pressure of the drywell 18 drives down a liquid level in the vent line 22. When the liquid level in the vent line 22 goes down to a position lower than the vent line steam discharge ports 23, both nitrogen and steam present in the drywell 18 flow out into the suppression pool 20. The nitrogen that has flown into the suppression pool 20 is next stored into the suppression chamber 19, hence contributing to an increase in pressure. However, a volume ratio between the drywell 18 and the suppression chamber 19 is designed to fall within an appropriate range to mitigate any impacts of the increase in pressure.

In the meantime, the steam that has flown into the suppression pool 20 is condensed by unsaturated water within the suppression pool and returns to water, so that pressurization of the primary containment vessel 17 by the generated steam can be sufficiently suppressed.

Even after the reactor has been shut down by the scram signal, the steam is continuously generated by decay heat due to nuclear decay of fission products (FPs) present in the core 13. However, since the amount of decay heat is as small as several percent or less of rated thermal output and the decay heat decreases exponentially with time, the amount of steam stemming from the core 13 decreases and thus a differential pressure between the drywell 18 and the suppression chamber 19 decreases. As a result, the liquid level in the vent line 22 that has been driven down starts to rise and the vent line steam discharge portions 23 becomes submerged, whereby the flow of steam into the suppression pool 20 via the vent line 22 is stopped.

The amount of nitrogen that has existed inside the drywell 18 is totally moved to the suppression chamber 19 in the early stage by the steam released immediately after line breakage, so that the drywell 18 is filled with the steam when the flow of steam into the suppression pool 20 via the vent line 22 is stopped.

In the meantime, the non-condensate gas (nitrogen) and steam within the drywell 18 are also discharged into the suppression pool 20 or the reactor pressure vessel 15 through the route extending to the steam suction line 6, the heat exchanger 1, the first condensate discharge line 7, the condensate storage tank 5, and the second condensate discharge line 9 or the non-condensate gas discharge line 8 or the condensate return line 10, in that order. The following describes related operation of the system. A case in which either the air-operated valve 11 or the squib valve 12 operates as envisaged is first described below.

Immediately after line breakage, nitrogen that is a non-condensate gas, and the steam that has flown out from the broken line surfaces are present in mixed form in the drywell 18 and this fluid mixture flows into the heat exchanger 1 via the steam suction line 6. When the incoming steam passes through the heat exchanger 1, this steam is condensed back into water, whereas the nitrogen having a low heat transfer coefficient passes through the heat exchanger 1 without substantially losing heat. The condensate and the nitrogen are conducted into the condensate storage tank 5 via the first condensate discharge line 7 and then separated by gravity inside the storage tank 5.

The condensate that has thus been deposited in a lower section of the condensate storage tank 5 is returned to the reactor pressure vessel 15 via either the air-operated valve 11 or the squib valve 12 as well as the condensate return line 10 connected to the bottom of the storage tank 5. The nitrogen that has been deposited in an upper section of the condensate storage tank 5 is discharged to a neighborhood of the liquid level in the suppression pool 20 via the non-condensate gas discharge line 8 connected to an upper section of the condensate storage tank 5.

The open end of the non-condensate gas discharge line 8 that is disposed in the suppression pool 20 is positioned at a height greater than that of the vent line steam discharge ports 23 on the vent line 22. Because of this difference in height, a coolant pressure upon discharge ports of the non-condensate gas discharge line 8 is low and the nitrogen from the route passing through the non-condensate gas discharge line 8 is preferentially discharged earlier than the nitrogen discharged from the route passing through the vent line 22.

Hence, when the air-operated valve 11 or the squib valve 12 operates as envisaged, after the steam generated in the core 13 has been returned to a state of a condensate, this condensate can be supplied to the core 13 within the reactor pressure vessel 15 via the condensate return line 10. The inventory of coolant in the reactor pressure vessel 15 can also be maintained over a long term.

The following describes a case in which, for whatever reason, neither the air-operated valve 11 nor the squib valve 12 operates as envisaged. Since the air-operated valve 11 and the squib valve 12 are arranged in parallel, if either operates properly, the condensate return line 10 can be used. Additionally, a likelihood of simultaneous operational failures due to a common cause is eliminated as far as possible by diversification of the kinds of valves. For these reasons, a possibility that the passive residual heat removal system of the present embodiment would encounter a situation that the condensate return line 10 cannot be used and thus the condensate cannot be returned to the core 13 is infinitely close to zero. The following, however, envisages such a situation in terms of defense in depth.

Immediately after line breakage, nitrogen that is a non-condensate gas, and the steam that has flown out from the broken line surfaces are present in mixed form in the drywell 18 and this fluid mixture flows into the heat exchanger 1 via the steam suction line 6. When the incoming steam passes through the heat exchanger 1, this steam is condensed back into water, whereas the nitrogen having a low heat transfer coefficient passes through the heat exchanger 1 without substantially losing heat. The condensate and the nitrogen are conducted into the condensate storage tank 5 via the first condensate discharge line 7 and then separated by gravity inside the storage tank 5.

Since the non-operation of both the air-operated valve 11 and the squib valve 2 is presumed herein, the condensate deposited in the lower section of the condensate storage tank 5 cannot return to the reactor pressure vessel 15 via the condensate return line 10. Thus, the condensate is discharged to a base of the suppression pool 20 via the second condensate discharge line 9 connected above the condensate return line 10. The nitrogen deposited in the upper section of the condensate storage tank 5 is discharged to the neighborhood of the liquid level in the suppression pool 20 via the non-condensate gas discharge line 8 connected to the upper section of the condensate storage tank 5.

Since the open end of the non-condensate gas discharge line 8 that is disposed in the suppression pool 20 is positioned at a height greater than that of the vent line steam discharge ports 23, the coolant pressure upon the discharge ports of the non-condensate gas discharge line 8 is low and the nitrogen from the route passing through the non-condensate gas discharge line 8 is preferentially discharged earlier than the nitrogen discharged from the route passing through the vent line 22.

Since the coolant pool 3 located outside the heat exchanger 1 is installed under an atmospheric pressure environment, the coolant boils while the decay heat occurring inside the core 13 is removed via the heat exchanger 1, and the coolant temperature in the pool reaches 100° C. Accordingly, the condensate temperature at an outlet of the heat exchanger 1 cannot decrease below 100° C. and as a result, this relatively hot condensate flows into the suppression pool 20 via the second condensate gas discharge line 9.

The open end of the second condensate discharge line 9, disposed in the suppression pool 20, is positioned at a height smaller than that of the lowest discharge port of the vent line steam discharge ports 23 on the vent line 22, that is, in a neighborhood of the base of the suppression pool 20. This difference in height prevents temperature stratification, or occurrence of an event that only the coolant temperature in the neighborhood of the liquid level in the suppression pool 20 locally rises, and thereby prevents an excessive pressure rise from occurring in the suppression chamber 19.

As a result, rises in the internal pressure of the primary containment vessel 17 can be alleviated, even if for whatever reason the air-operated valve 11 and the squib valve 12 both fail to operate.

Incidentally, an active coolant injection system (not shown) driven by an alternating-current power supply is usually utilized in case of the line breakage described above. If station blackout is assumed as a severer situation in terms of defense in depth, however, under the situation that the air-operated valve 11 and the squib valve 12 both fail to operate and the condensate return line 10 cannot be used, no means is available to inject a coolant into the core 13. Without any means available to inject the coolant into the core 13, the decay heat occurring inside the core 13 is likely to gradually reduce the amount of coolant in the reactor pressure vessel 15 to a liquid level at which the core 13 becomes uncovered to melt.

If the core 13 were to melt and become hotter, it would damage the base of the reactor pressure vessel 15 and drop onto the pedestal 21. After dropping, the core 13 is likely to heat the fusible plug valve 27. Then, the heated fusible plug valve 27 will finally fuse to open and the coolant in the suppression pool 20 will be poured into the pedestal 21. The coolant thus supplied from the suppression pool 20 to the pedestal 21 can be used to resultingly cool down the melted core 13 that has dropped onto the pedestal.

The steam that occurs during the cooling of the melted core 13 will move to the drywell 18 via the connecting hole 24, and then the steam will be guided into the heat exchanger 1 via the steam suction line 6 opened into the drywell 18. Next after being condensed in the heat exchanger 1, the steam is once again supplied to the pedestal 21 via the condensate storage tank 5, the second condensate discharge line 9, and the suppression pool 20, in that order.

The highly reliable passive residual heat removal system and nuclear power plant equipment provided in the present embodiment are configured to enable stable cooling of the core even if it melts and drops onto the pedestal 21 under the unusual situation of an infinitely near-zero probability that line breakage, station blackout, and simultaneous operational failures in the air-operated valve 11 and the squib valve 12 might be occurring.

In accordance with the above first embodiment of the passive residual heat removal system and nuclear power plant equipment according to the present invention, even if fluid line breakage of the reactor pressure vessel 15 occurs and the steam resultingly generated in the reactor pressure vessel 15 is returned to the state of a condensate, this condensate can be fed into the reactor pressure vessel 15 and thus the inventory of coolant in the reactor pressure vessel 15 can be maintained over a long term. Additionally, rises in the internal pressure of the reactor pressure vessel 15 can be alleviated, even if for whatever reason the supply of the coolant to the reactor pressure vessel 15 fails.

Since the internal pressure of the reactor pressure vessel 15 is higher than that of the drywell 18 immediately after the line breakage, there is a period when the condensate cannot be returned to the reactor pressure vessel 15 via the condensate return line 10. However, if the amount of condensate held in the condensate storage tank 5 is substantially equal to that of coolant which flows out from the reactor pressure vessel 15 for the term during which the condensate cannot be returned, the core 13 can be submerged in the tank-held coolant once again after the condensate return line 10 has become reuseable. The amount of coolant stored in the condensate storage tank 5 here is calculated using following expression (1):

$$V \geq 20 \times Q \quad (1)$$

where V is the amount of coolant (m$^3$) in n the condensate storage tank 5 and Q is the thermal output power in gigawatts (GW) of the core 13 under rated operation.

Additionally, in accordance with the above first embodiment of the passive residual heat removal system and nuclear power plant equipment according to the present invention, since the check valve 25 is provided on the condensate return line 10, even if the air-operated valve 11 or the squib valve 12 is opened under a high internal-pressure state of the reactor pressure vessel 15, the condensate storage tank 5 and the heat exchanger 1 can be prevented from reaching a high internal pressure. This enables the passive residual heat removal system to be designed for a lower withstand pressure.

The condensate discharge port of the second condensate discharge line 9, positioned in the suppression pool 20, may be branched into a plurality of horizontal lines, and the condensate discharge port may be open at distal ends of each of the branched horizontal lines. This will allow a high-temperature condensate of at least 100° C. to be released in a spatially dispersed condition and hence a local rise in the temperature of the pooled coolant to be further suppressed.

While the above description of the present embodiment assumes that the heat transfer lines 1c of the heat exchanger 1 in the coolant pool 3 are arranged in a vertical direction, the invention does not limit the layout form of the heat transfer lines 1c to vertical arrangement; the heat transfer lines 1c may be arranged in a horizontal direction in the heat exchanger 1.

Second Embodiment

Figure 3:
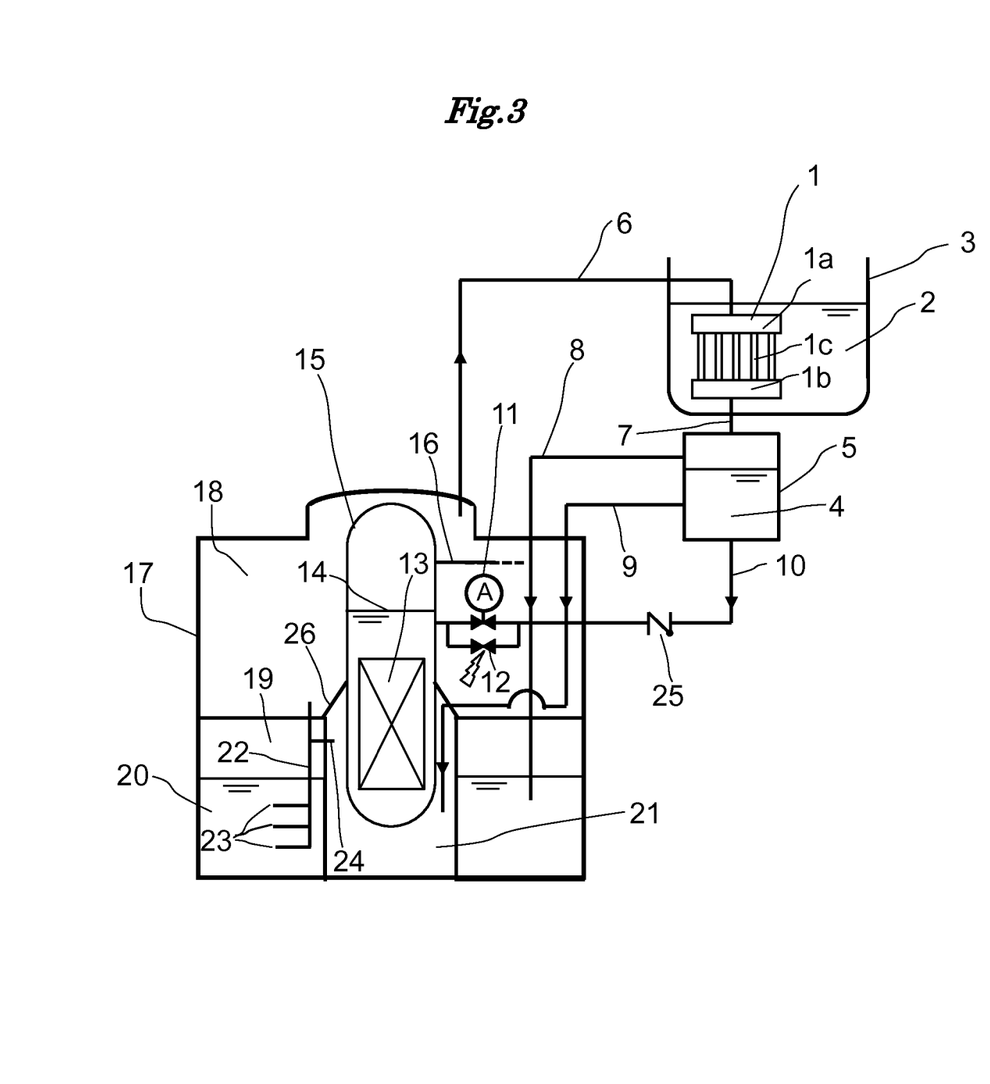
FIG. 3 is a system diagram showing a configuration of a passive residual heat removal system and nuclear power plant equipment according to a second embodiment of the present invention.

A second embodiment of a passive residual heat removal system and nuclear power plant equipment according to the present invention is described below using the accompanying drawings. FIG. 3 is a system diagram showing a configuration of the passive residual heat removal system and nuclear power plant equipment according to the second embodiment of the present invention.

In the second embodiment of the passive residual heat removal system and nuclear power plant equipment according to the present invention, the passive residual heat removal system configuration is substantially the same as the system configuration of the first embodiment. The second embodiment, however, differs from the first embodiment in that the former does not include the fusible plug valve 27 and in that a discharge destination of the second condensate discharge line 9 is changed from the suppression pool 20 to the pedestal 21.

The following describes how the passive residual heat removal system in the present embodiment operates if one of the main steam lines significantly breaks in area. Description of functions and operation concerning the route through the vent line 22 is omitted herein since the functions and operation relating to this route are substantially the same as in the first embodiment. First described below is the operation relating to the route through which the nitrogen and steam in the drywell 18 are discharged into the suppression pool 20 or the reactor pressure vessel 15 or the pedestal 21 via the steam suction line 6, the heat exchanger 1, the first condensate discharge line 7, the condensate storage tank 5, and the second condensate discharge line 9 or the non-condensate gas discharge line 8 or the condensate return line 10, in that order. System operation in the case that either the air-operated valve 11 or the squib valve 12 operates as envisaged is the same as in the first embodiment, so no description is given of the system operation concerned; only system operation in the case that for whatever reason the air-operated valve 11 and the squib valve 12 both fail to operate, is described below.

Immediately after the line breakage, the nitrogen that is a non-condensate gas, and the steam that has flown out from the broken line surfaces are present in mixed form in the drywell 18 and this fluid mixture flows into the heat exchanger 1 via the steam suction line 6. When the incoming steam passes through the heat exchanger 1, this steam is condensed back into water, whereas the nitrogen of a low heat transfer coefficient passes through the heat exchanger 1 without substantially losing heat. The condensate and the nitrogen are conducted into the condensate storage tank 5 via the first condensate discharge line 7 and then separated by gravity inside the storage tank 5.

Since the non-operation of both the air-operated valve 11 and the squib valve 2 is presumed herein, the condensate deposited in the lower section of the condensate storage tank 5 cannot return to the reactor pressure vessel 15 via the condensate return line 10. As a result, the condensate is discharged to the pedestal 21 via the second condensate discharge line 9 connected above the condensate return line 10. The nitrogen deposited in the upper section of the condensate storage tank 5 is discharged to the neighborhood of the liquid level in the suppression pool 20 via the non-condensate gas discharge line 8 connected to the upper section of the condensate storage tank 5.

Since the open end of the non-condensate gas discharge line 8, disposed in the suppression pool 20, is positioned at a height greater than that of the vent line steam discharge ports 23, the coolant pressure upon the discharge ports of the non-condensate gas discharge line 8 is low and the nitrogen from the route passing through the non-condensate gas discharge line 8 is preferentially discharged earlier than the nitrogen discharged from the route passing through the vent line 22.

An active coolant injection system (not shown) driven by an alternating-current power supply is usually utilized in case of the line breakage described above. If station blackout is assumed as a severer situation in terms of defense in depth, however, under the situation that the air-operated valve 11 and the squib valve 12 both fail to operate and the condensate return line 10 cannot be used, no means is available to inject a coolant into the core 13. Without any means available to inject the coolant into the core 13, the decay heat occurring inside the core 13 is likely to gradually reduce the amount of coolant in the reactor pressure vessel 15 to a liquid level at which the core 13 becomes uncovered to melt.

If the core 13 were to melt and become hotter, it would damage the base of the reactor pressure vessel 15 and drop onto the pedestal 21. In the present embodiment, however, the condensate discharged from the heat exchanger 1 can be supplied to the pedestal 21 via the second condensate discharge line 9, so even without the fusible plug valve 27 as used in the first embodiment, the coolant supplied to the pedestal 21 can be used to cool down the melted core 13 that has dropped onto the pedestal.

The steam that occurs during the cooling of the melted core 13 will move to the drywell 18 via the connecting hole 24, and then the steam will be guided into the heat exchanger 1 via the steam suction line 6 opened into the drywell 18. Next after being condensed in the heat exchanger 1, the steam is once again supplied to the pedestal 21 via the condensate storage tank 5 and the second condensate discharge line 9, in that order.

The highly reliable passive residual heat removal system and nuclear power plant equipment provided in the present embodiment are configured to enable stable cooling of the core even if it melts and drops onto the pedestal 21 under the unusual situation of an infinitely near-zero probability that line breakage, station blackout, and simultaneous operational failures in the air-operated valve 11 and the squib valve 12 might be occurring.

The second embodiment of the passive residual heat removal system and nuclear power plant equipment according to the present invention offers substantially the same advantageous effects as those of the first embodiment.

Third Embodiment

Figure 4:
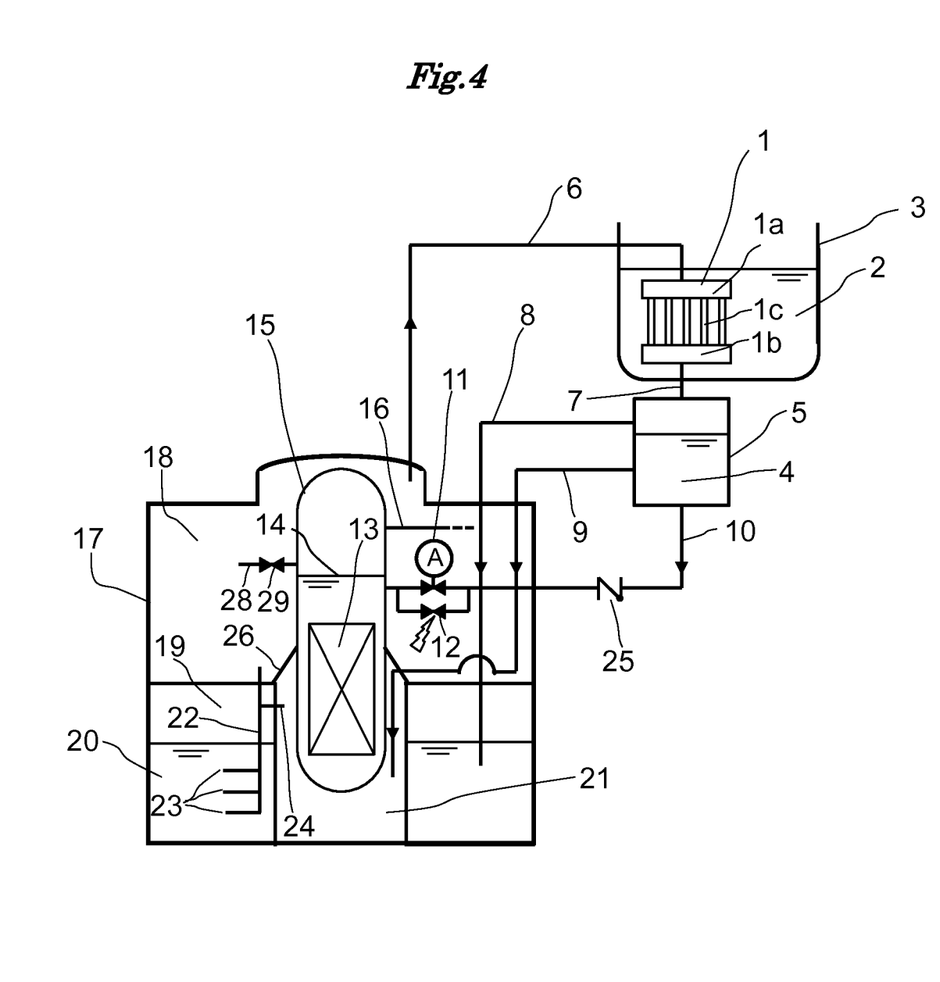
FIG. 4 is a system diagram showing a configuration of a passive residual heat removal system and nuclear power plant equipment according to a third embodiment of the present invention.

A third embodiment of a passive residual heat removal system and nuclear power plant equipment according to the present invention is described below using the accompanying drawings. FIG. 4 is a system diagram showing a configuration of the passive residual heat removal system and nuclear power plant equipment according to the third embodiment of the present invention.

In the third embodiment of the passive residual heat removal system and nuclear power plant equipment according to the present invention, the passive residual heat removal system configuration is substantially the same as the system configuration of the second embodiment. The third embodiment, however, differs from the second embodiment in that the former includes a depressurization line 28 that connects the inside of the reactor pressure vessel 15 and the drywell 18 of the primary containment vessel 17, and a depressurization valve 29 that opens/closes the depressurization line 28. The depressurization valve 29 here is a squib valve or any other element that is highly reliable and needs no alternating-current power supply to operate.

Next, operation of the passive residual heat removal system in the present embodiment is described below. In the first and second embodiments, a description has been given of how the passive residual heat removal system operates under the breakage of one main steam line that is a severe event as viewed in terms of an increase in the internal pressure of the primary containment vessel and a loss of core-cooling performance.

If it is assumed that one main steam line 16 suffers minor breakage of a small breakage area, in either the first or second embodiment, the passive residual heat removal system including the vent line 22 and the heat exchanger 1 cannot operate since the amount of steam released from the reactor pressure vessel 15 to the drywell 18 is small and hence since the internal pressure of the drywell 18 substantially does not rise. In this case, since the amount of steam released from the reactor pressure vessel 15 to the outside is small, coolant can be supplied to the core 13 with a sufficient margin in time by utilizing an active coolant injection system (not shown) that is driven by an alternating-current power supply.

In addition, even if station blackout is assumed as a severer situation in terms of defense in depth, since there is a margin in time in comparison with the case in which one main steam line 16 suffering significant breakage, a variety of alternative means, such as supplying coolant to the reactor pressure vessel 15, can be provided in advance by using an external pump and external water (neither is shown) after depressurizing the reactor pressure vessel 15.

The depressurization line 28 and depressurization valve 29 in the present embodiment are provided in terms of defense in depth, and the embodiment features stable cooling of the core 13, even if under such minor breakage of one main steam line 16 as described above, the coolant cannot be supplied to the reactor pressure vessel 15 using an external pump and external water. The following describes the operation of the passive residual heat removal system in the present embodiment.

Under the minor breakage state of one main steam line 16, an operator upon judging neither an external pump nor external water to be useable opens the depressurization valve 29 by remote operations from a main control room. When the depressurization valve 29 is opened, the steam within the reactor pressure vessel 15 is forcibly discharged into the drywell 18. The forced discharge of the steam from the reactor pressure vessel 15 into the drywell 18 raises the internal pressure of the drywell 18, thus enabling the operation of the passive residual heat removal system including the vent line 22 and the heat exchanger 1. The behavior after the operation of the passive residual heat removal system has already been explained in the second embodiment.

As described above, the depressurization line 28 connecting the reactor pressure vessel 15 and the drywell 18, and the depressurization valve 29 are disposed in the present embodiment. The minor breakage state of the main steam line 16 can therefore be forcibly shifted to a major breakage state, which in turn enables the operation of the passive residual heat removal system, hence enhancing the reliability of the passive residual heat removal system and nuclear power plant equipment.

The third embodiment of the passive residual heat removal system and nuclear power plant equipment according to the present invention offers substantially the same advantageous effects as those of the first embodiment.

It is to be understood that the present invention is not limited to the above-described embodiments and may contain various modifications. The above embodiments have only been detailed for a better understanding of the invention and are not always limited to ones including all described constituent elements. For example, part of the configuration of an embodiment may replace the configuration of another embodiment, or the elements of an embodiment may be added to those of another embodiment. Further alternatively, part of the elements of an embodiment may be added to, deleted from, or replaced by those of another embodiment.

What is claimed is:

1. A passive residual heat removal system, comprising:
a reactor pressure vessel;
a reactor core placed in the reactor pressure vessel;
a primary containment vessel including a drywell to surround the reactor pressure vessel, and a suppression chamber internally provided with a suppression pool;
a vent line connecting the drywell and the suppression pool, the vent line being fitted with a plurality of openings in the suppression pool;
a coolant pool filled with a coolant and provided above the primary containment vessel;
a heat exchanger placed under the coolant in the coolant pool;
a steam suction line connecting the drywell and the heat exchanger;
a condensate storage tank disposed below the heat exchanger and above an upper end of the reactor core;
a first condensate discharge line connecting the condensate storage tank and the heat exchanger;
a non-condensate gas discharge line connected at a first end thereof to an upper section of the condensate storage tank and at a second end thereof to the suppression pool, the second end of the non-condensate gas discharge line being open at a position higher than a highest opening of the vent line in the suppression pool;
a second condensate discharge line connected at a first end thereof to a position below that section of the condensate storage tank to which the first end of the non-condensate gas discharge line is connected, and at a second end thereof to the suppression pool, the second end of the second condensate gas discharge line being open at a position lower than a lowest opening of the vent line in the suppression pool; and
a condensate return line connected at a first end thereof to a position below that section of the condensate storage tank to which the first end of the second condensate discharge line is connected, and at a second end thereof to a side portion of the reactor pressure vessel, the side portion being above the upper end of the core;
wherein the open end of the second condensate discharged line, positioned in the suppression pool, is branched into a plurality of horizontal lines, with condensate discharge ports being formed at distal ends of the branched horizontal lines.

2. A passive residual heat removal system, comprising:
a reactor pressure vessel;
a reactor core placed in the reactor pressure vessel;
a primary containment vessel including a drywell to surround the reactor pressure vessel, a suppression chamber internally provided with a suppression pool, and a pedestal formed directly under the reactor pressure vessel, as space that is demarcated atop from the drywell;
a vent line connecting the drywell and the suppression pool, the vent line being fitted with a plurality of openings in the suppression pool;
a coolant pool filled with a coolant and provided above the primary containment vessel;
a heat exchanger placed under the coolant in the coolant pool;
a steam suction line connecting the drywell and the heat exchanger;
a condensate storage tank disposed below the heat exchanger and above an upper end of the reactor core;
a first condensate discharge line connecting the condensate storage tank and the heat exchanger;
a non-condensate gas discharge line connected at a first end thereof to an upper section of the condensate storage tank and at a second end thereof to the suppression pool, the second end of the non-condensate gas discharge line being open at a position higher than a highest opening of the vent line in the suppression pool;
a second condensate discharge line connected at a first end thereof to a position below that section of the condensate storage tank to which the first end of the non-condensate gas discharge line is connected, and at a second end thereof to the pedestal; and
a condensate return line connected at a first end thereof to a position below that section of the condensate storage tank to which the first end of the second condensate discharge line is connected, and at a second end thereof to a side portion of the reactor pressure vessel, the side portion being above the upper end of the core;
wherein parallel branches are provided on part of the condensate return line, a squib valve is provided as a condensate return valve on one of the parallel branch lines, and an air-operated valve is provided as another condensate return valve on the other branch line.

3. The passive residual heat removal system according to claim 1, further comprising:
a depressurization line connecting the reactor pressure vessel and the primary containment vessel, and a depressurization valve opening/closing the depressurization line.

4. The passive residual heat removal system according to claim 1, wherein:
a ratio of V/Q between the amount of coolant, V (m$^3$), in the condensate storage tank, and thermal output power Q (GW) of the core under rated operation, is at least 20.

5. A nuclear power plant facility, comprising the passive residual heat removal system according to claim 1.

* * * * *